Sept. 29, 1953             C. RINGWALD             2,654,079
SAFETY SIGNAL APPARATUS FOR MOTOR VEHICLES
Filed June 27, 1951                                        4 Sheets-Sheet 1

Inventor
Clarence Ringwald
By Brown, Jackson, Boettcher & Dienner
Att'ys.

Sept. 29, 1953  C. RINGWALD  2,654,079
SAFETY SIGNAL APPARATUS FOR MOTOR VEHICLES
Filed June 27, 1951  4 Sheets-Sheet 2

Inventor
Clarence Ringwald
By:- Brown, Jackson, Boettcher & Dienner
Attys

Sept. 29, 1953 C. RINGWALD 2,654,079
SAFETY SIGNAL APPARATUS FOR MOTOR VEHICLES
Filed June 27, 1951 4 Sheets-Sheet 3
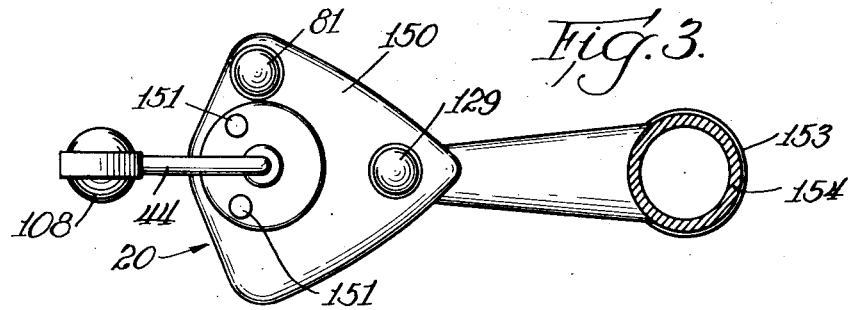
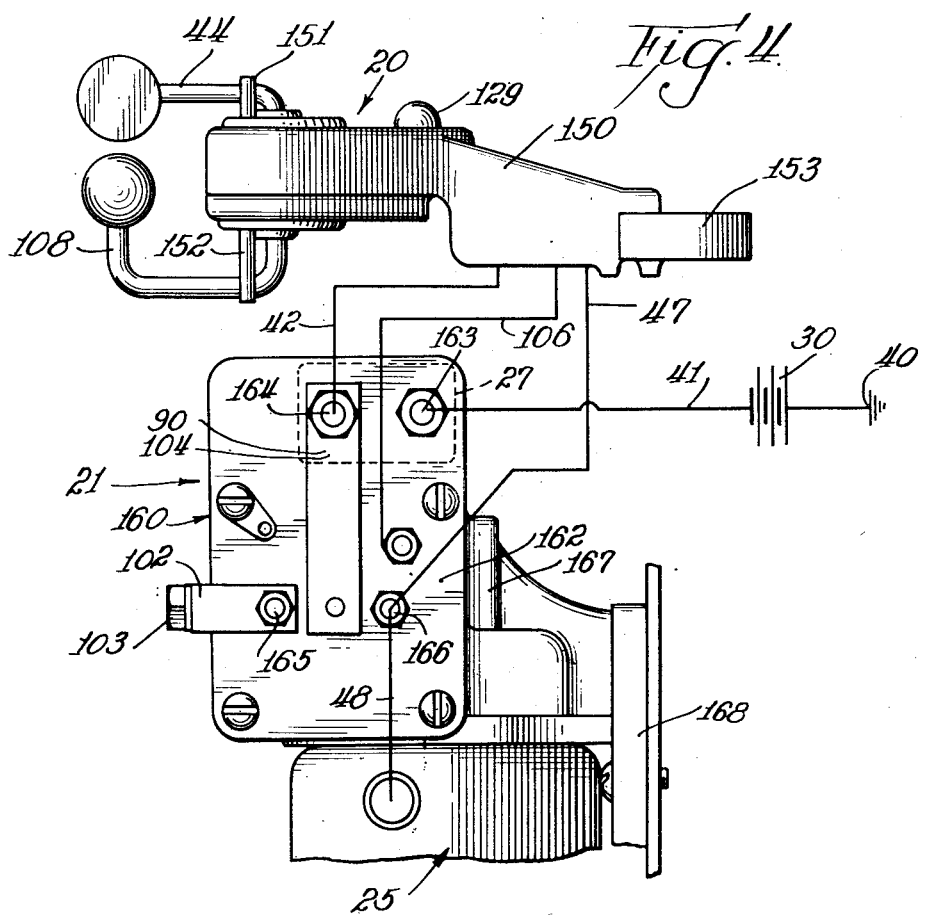
Inventor;
Clarence Ringwald
By:-
Brown, Jackson, Boettcher & Dienner
Attys.

Sept. 29, 1953     C. RINGWALD     2,654,079
SAFETY SIGNAL APPARATUS FOR MOTOR VEHICLES
Filed June 27, 1951     4 Sheets-Sheet 4
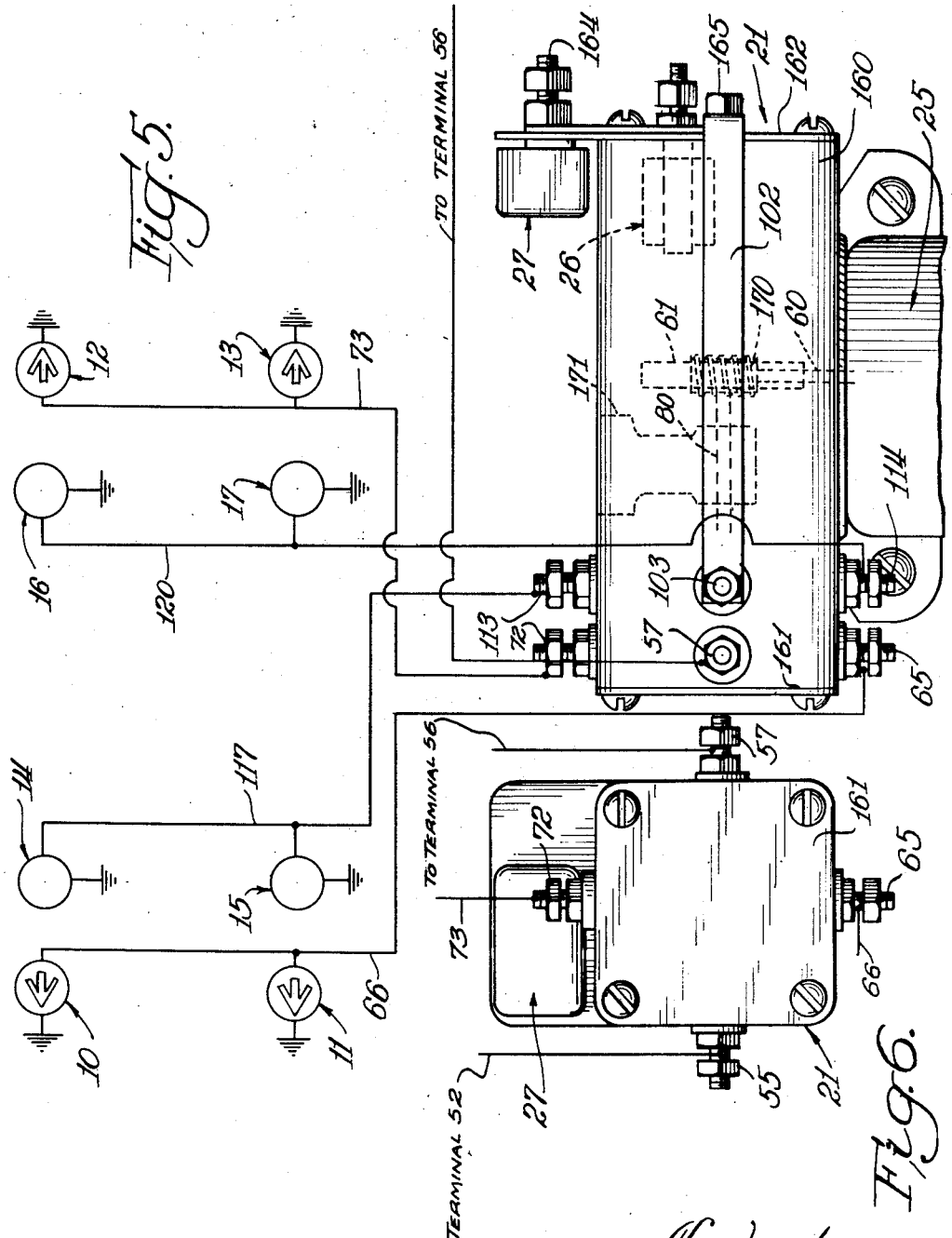
Inventor
Clarence Ringwald
By:- Brown, Jackson, Boettcher & Dienner
Attys

UNITED STATES PATENT OFFICE 2,654,079

SAFETY SIGNAL APPARATUS FOR MOTOR VEHICLES

Clarence Ringwald, Springfield, Ohio

Application June 27, 1951, Serial No. 233,827

8 Claims. (Cl. 340—81)

1

This invention relates to visual signals, their association in an electrical circuit, and the control medium therefor, particularly as related to motor vehicles, such as school busses or the like, for indicating, through selective energization and operation of such signals, the intentions of the operator of such a vehicle.

Briefly, I contemplate a combined warning and turn indicating signal system for particular use on school busses or a like class of motorized vehicles, by which the operator of such a vehicle is equipped to indicate turning movements of his vehicle, as well as flash a series of warning and stop signals as he selects; both the turning and warning signals constituting flashing incandescent lamps, but the selective controls therefor being so arranged that no conflict in their flashing visual attraction ensues during the simultaneous operation thereof.

An important object of this invention is to provide an improved signalling system which will effectively indicate the intentions of the operator of a motorized vehicle, such as a bus, to insure greater safety in its operation along the highway, especially in conveying such intentions of the bus operator to operators of other vehicles.

Another important object of this invention is to provide an operating circuit embodying a plurality of electrical devices whereby an operator of a school bus or a like motor vehicle is enabled to flash turn signal or warning and stop signal lights, individually or simultaneously, with a minimum of effort, so as to indicate his operational intentions to operators of other motor vehicles on the highway.

Still another object of this invention is to disclose a means for simultaneously operating a pair of cam operated signal breakers with a single motor driven cam, whereby said breakers, in conjunction with a circuit relay, are adapted automatically to operate turn signal and warning and stop signal light circuits either separately or simultaneously, as desired.

These and further objects and features of my invention will be recognized by one familiar with the art from the following detail description and specifications, and in conjunction with the accompanying drawings.

In the drawings:

Figure 1 is a schematic representation of an electrical circuit and control mediums used therein embodying the features of my invention and displaying the various control devices and their related association in a grounded type circuit arrangement;

2

Figure 3 is a plan elevational view of the dual steering column control switch mechanism used in the circuit of Figure 1, demonstrating the arrangement of the signal pilot lights associated therewith;

Figure 4 is a schematic view displaying the control switch mechanism of Figure 3 in front elevation, and indicating its circuit connection with connective terminals associated with the motor driven signal breaker switch unit, which is shown in partial end elevation in this figure;

Figure 5 is an enlarged partial front elevation of the unit containing the cam operated signal breakers, the terminal connectors for such breakers and a schematic wiring diagram showing the electrical connection of the signal breakers in their respective signal lamp circuits;

Figure 6 is a developed end elevational view of the unit shown in Figure 5 looking at the left hand end thereof.

Figure 1:
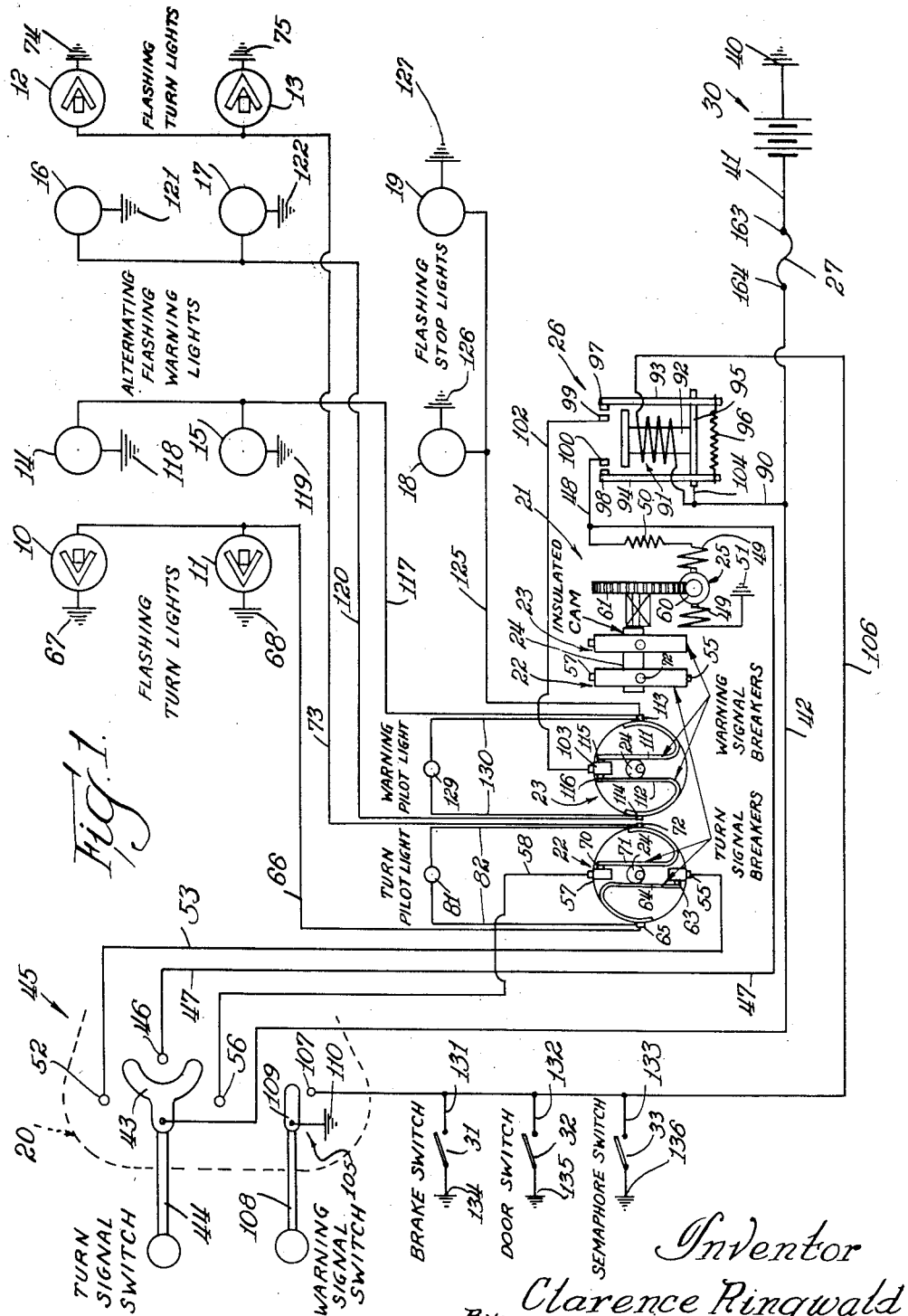
Figures 2, 7:
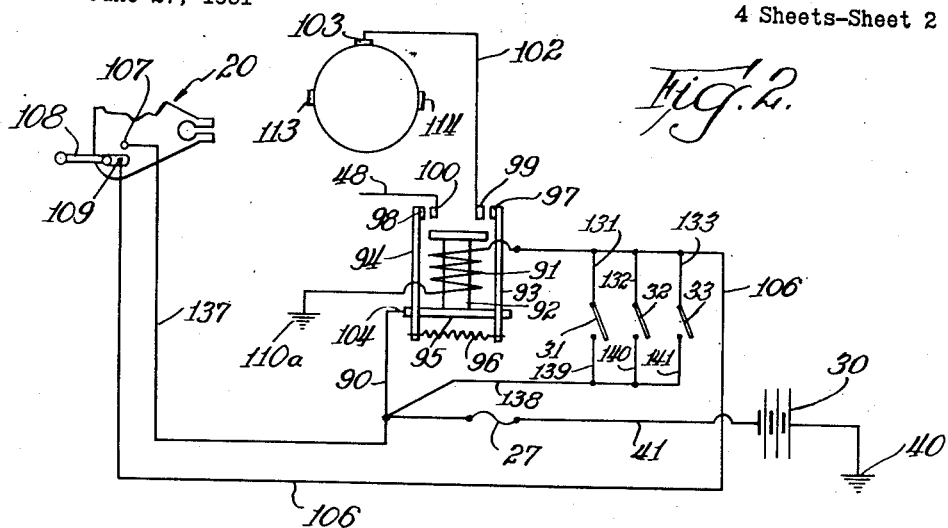
Figure 2 is another schematic circuit diagram displaying a portion of the circuit illustrated in Figure 1 for demonstrating an alternate insulated circuit arrangement for several of the control switches shown in Figure 1.
Figure 7 is an end elevational view of the signal breaker unit shown in Figure 5, displaying the left-hand end of such unit as it appears in Figure 5, with the cover thereof removed to reveal the internal disposition of the cam operated signal breakers therein.

Referring now to Figures 1 and 2 of the drawings wherein is set forth the general schematic wiring diagram of my signal control circuit as applied to a school bus or a like motor vehicle, it will be observed that a plurality of turn signal lights 10, 11, 12, and 13 are arranged for mounting to the vehicle, preferably two on the front exterior and two on the rear exterior at the four corners of the vehicle, for signalling the turning movements of the vehicle. Lights 10 and 11, illustrated in Fig. 1, are adapted to be mounted at front and rear corner positions on the vehicle and indicate, when energized, left turning movement of the vehicle. Similarly, lamps 12 and 13 are correspondingly mounted on the right front and rear corners of the vehicle for indicating right turning movements thereof.

Additionally, four warning lights 14, 15, 16 and 17 are provided; lights 14 and 16 being mountable in spaced relation on the front of the vehicle, and lights 15 and 17 similarly mountable on the rear thereof at a suitable position for ready observation by operators of other vehicles on the highway. A pair of stop lights 18 and 19 are also provided, such being normally adapted for mounting on the rear of the vehicle, one near either rear corner thereof to indicate stopping of the vehicle. Although additional or fewer lights than those listed above may be utilized, as desired, the ten lights listed so far will serve to amply illustrate the advantages of a typical bus lighting system controlled in a manner to be disclosed herein, according to the teachings of my invention.

The various lights referred to heretofore are preferably of an electrical incandescent lamp variety designed to be intermittently energized to create a flashing eye attracting appearance, with the various lamps indicating turning, warning and stop signals being covered with glass or plastic lenses having such colors as amber, white, and red, respectively, or other colors as desired.

To control the illumination of the various lamps in a desired sequence, I have provided a dual turn signal and warning lamp control switch 20 mountable to the vehicle steering column for a ready accessibility to the operator.

I have also provided a new and improved flasher means for flashing the lights by means of intermittent electrical energization, such means being indicated generally at 21 and comprising a turning lamp signal breaker 22 and a warning lamp signal breaker 23, a common cam operator 24 therefor, an electrical motor 25 having driving connection with the operating cam 24, a multiple contact solenoid switching unit 26 and a circuit breaker or fuse 27; a battery source of electrical potential 30 being utilized to energize the lamps. Additionally, various push button, plunger or similar types of remote control switches 31, 32 and 33 are provided to operate the warning lamps and flashing stop lamps under various circumstances. In this latter connection, switch 31, for example, may be utilized to operate the warning lights upon depression of the brake pedal; switch 32 upon opening the door to discharge a passenger; and switch 33 upon actuation of a familiar mechanical semaphore style of stop indicator. Other switches of this latter type may, of course, be utilized for automatic energization of the warning and stop lamps to indicate other operating conditions of the bus as desired, their number and purpose, as indicated herein, being for illustrative purposes only.

Referring now specifically to the grounded type circuit diagram of Figure 1, it will be recognized that the battery source of electrical potential 30 has its negative side grounded as at 40 by connection to the vehicle chassis or the like and its positive side connected directly by conductor 41 to the circuit breaker or fuse 27. From the circuit breaker 27, the circuit from battery is divided, and for simplicity I shall initially describe the circuit for energizing the turn signal lamps 10—13. From fuse 27 one branch conductor 42 connects fuse 27 in series with operating contact arms 43, associated with a manual turn signal lever 44, for operating a double throw, three pole turn signal switch 45 housed in the combined manually operable turn and warning signal switch unit 20, which is mounted on the steering column of the vehicle. Leading from the center pole 46 of the turn signal switch 45, conductor 47 connects in series with the cam operated breaker control motor 25 via an additional branch conductor 48 which, in turn, is connected to the windings 49 of the motor and a ballast coil 50, with one side of the motor being connected to ground as at 51. Additionally, a secondary pole 52 of the turn signal switch 45 is connected by conductor 53 to one terminal 55 of the cam actuated turn signal breaker 22. A third pole 56 of switch 45 is similarly electrically connected to a second terminal 57 of the turn signal breaker 22 by conductor 58. By this arrangement, movement of the manual contact arm 44 and contacts 43 thereon of the turn signal switch 45, to bridge poles 46 and 52 or poles 46 and 56 of the switch 45, will cause completion of the circuit from battery through the central terminal 46 of the switch 45 to energize the motor 25, which axially rotates cam 24 via an armature worm shaft 60 and worm gear 61 to cause intermittent interruption of the turn signal circuit selected by the turn signal selector lever 44 is moved upwardly, in Figure 1, so as to bridge the poles or contacts 52 and 46 of the switch 45, the motor 25 will be energized through switch 45 via conductor 47 and 48, and terminal 55 of breaker 22 will be energized through conductor 53. Conversely, if the selector lever 44 bridges poles 46 and 56, the motor 25 will again be energized through switch 45 via conductors 47 and 48, and terminal 57 of the breaker 22 will be energized through conductor 58. It will be seen that terminal 55 of the switch breaker 22 is provided with a single contact 63 and that a resilient spring contact arm 64 leads therefrom to an external breaker connective terminal 65 mounted at one side of the cam breaker unit 22. From connector terminal 65 a conductor 66 connects with the turn signal lamps 10 and 11, each of which has one side thereof connected to ground, as at 67 and 68, respectively, with the lamps being connected in parallel from conductor 66. Thus, it will be recognized that if terminal 55 of breaker 22 is energized and the spring contact arm 64 rests against contact 63 of the terminal 55, lights 10 and 11 will be energized. Likewise, terminal 57 of the breaker unit 22 is provided with a single contact 70; such being positioned on the opposide of terminal 57 from contact 63 on terminal 55. A second resilient contact arm 71 connects contact 70 in circuit with a second external connective terminal 72 on the breaker 22. From terminal 72 a conductor 73 is connected with the turn signal lamps 12 and 13, such being again connected in parallel relation and having one side thereof connected to ground, as at 74 and 75, respectively, so that if terminal 57 of breaker 22 is energized and contact arm 71 is resting against contact 70 thereof, signal lamps 12 and 13 will be energized. It further will be recognized, from enlarged Figure 6 of the drawings, that the eccentric 24 is mounted between the resilient contact arms 64 and 71 on an eccentrically positioned shaft 80, so that rotation of eccentric 24 serves to periodically separate the contact arms 64 and 71 from their respective contacts 63 and 70, thus causing an intermittent energization to their respective turn signal lamps 10 and 11, and 12 and 13 to give these lamps periodic energization and a flashing interrupted appearance in use.

To indicate to the bus operator whether or not his turn signal switch is operating properly, I have provided a dash or steering column pilot light 81, which, as is shown in Figure 3, conveniently may be associated with the dual turn signal and warning signal control switch mounting unit 20. The lamp 81 is herein shown as a high resistance type and is connected across the terminals 65 and 72 of the breaker unit 22 by parallel connection via conductor 82, as seen in Figure 1.

It will be observed that if, for instance, terminal 55 of the circuit breaker 20 is energized by having the contact arms 43 bridging terminals 46 and 52 of the turn signal switch 45, then conductor 82 is energized to light bulb 81 through the connector terminal 65 when the circuit breaker arm 64 is contacting contact 63; the circuit through lamp 81 being completed to ground through the external terminal 72 of the breaker unit 22, via the turn signal lamp conductor 73 to the opposite or deenergized set of turn indicator lamps 13 and 14, and thence to ground at 74 or 75. In this connection, it should be recognized that because of the high resistance characteristics of the lamp 81, the current flow through conductor 73 is insufficient to energize either of the lamps 12 or 13 sufficiently to cause them to visably light up when the circuit to ground for lamp 81 is completed therethrough. Conversely, if the right-hand turn signal lamps 12 and 13 are energized, as explained heretofore, the pilot light 81 will correspondingly give forth a flashing signal completing its circuit to ground via conductor 66 to the left-hand turn signal lamps 10 and 11, and thence to ground at 67 and 68.

Coming now to the second circuit system embodied in the schematic circuit diagram of Figure 1 which comprises the means for intermittently energizing the alternating warning lamps 14—17 and the flashing stop lights 18 and 19, it will be observed from that figure that the second branch of the circuit from battery, after the fuse or circuit breaker 27, comprises a conductor 90 which leads to the multiple contact solenoid switching unit 26 where it connects in series with a solenoid coil 91 surrounding a movable core 92 of the solenoid unit 26. The solenoid unit is constructed with a pair of upright contact arms 93 and 94 bridged near their lower reaches by a transversely disposed slide bar member 95 having sliding connection with each of the contact arms 93 and 94 for movement relative thereto and rigidly fastened to one end of the core member 92 for movement therewith. A coil spring 96 interconnects the lower ends of the two contact arms 93 and 94, thereby to normally bias their upper ends apart, with the slide bar member 95 acting as a pivotal support in this action. At the upper end of each of the contact arms 93 and 94 is mounted a movable contact; contact 97 being associated with slide member 93 and contact 98 similarly associated with slide member 94. A conductor 104 also connects conductor 90 with the framing of the unit 26 to permit energization of its contact arms 93 and 94, current being carried between the two arms via slide bar 95. Adjacent each of the contact members 97 and 98 are other stationary contact members 99 and 100, respectively. Contact 100 is connected in circuit with conductor 48, which, as described heretofore, leads to the windings 49 of the motor 25 through the ballast coil 50 associated therewith. Contact 99, on the other hand, is in circuit with the second or warning lamp cam actuated breaker unit 23 by means of conductor 102, which connects with the single incoming terminal 103 thereof. The solenoid coil 91, associated with the solenoid unit 26, is also connected to the warning lamp switch 105 housed in the dual signal switch unit 20 by means of a conductor 106, which connects with one pole 107 of the warming lamp switch. Circuit through the warning lamp switch 105 is completed upon movement of the contact arm 108 thereof to bridge the terminal 107 with the second terminal 109, which, in turn, is grounded as at 110. It will thus be seen that the circuit from battery through the solenoid unit 26 and switch 105 includes the conductor 41, circuit breaker 27, conductor 90, solenoid coil 91, conductor 106, terminal 107 of the warning lamp switch 105, terminal 109 thereof and the ground connection 110. The circuit from battery to warning signal circuit breaker unit 23 includes conductor 41, circuit breaker or fuse 27, conductor 90, conductor 104, contact arm 93 and slide bar 95, contacts 97 and 99, and conductor 102 to terminal 103. The circuit from battery to motor 25 for energizing the latter to cause interruption of the warning and stop lights includes conductor 41, circuit breaker 27, conductor 104, contact arm 94, contacts 98 and 100, and conductor 48 to ballast coil 50 and motor winding 49 of the motor 25.

The warning lamp signal breaker unit 23 is again actuated, as signal breaker 22, by the common cam member 24, as was described in connection with the turn signal breaker 22; the warning lamp signal breaker 23 being provided with a pair of resilient contact arms 111 and 112, each leading to external connective terminals 113 and 114, respectively, and having contact with the incoming terminal 103 of the circuit breaker via a pair of separated contact buttons 115 and 116 associated with the terminal 103. A conductor 117 leads from the external connective terminal 113 of the warning lamp breaker unit 23 to one pair of warning lamps 14 and 15, with the circuit therethrough being completed to ground as at 118 and 119, respectively. Likewise, a second conductor 120 leads from connective terminal 114 to the opposite pair of warning lamps 16 and 17, which are connected to ground as at 121 and 122, respectively. In a similar fashion, flashing stop lights 18 and 19 are connected to terminal 113 of the warning lamp circuit breaker 23 by means of conductor 125, with each of the lamps 18 and 19 being grounded as at 126 and 127, respectively.

It will be recognized, that to energize the warning lamps 14 through 17 and the stop lights 18 and 19, it is first necessary to throw the selective lever 108 of the warning lamp switch 105 downwardly, as viewed in Figure 1, whereby contacts 107 and 109 thereof are closed or bridged. This action permits current to flow along conductor 41 through circuit breaker 27 and conductor 90 to energize the solenoid coil 91, and thence via conductor 106 to terminal 107 which is closed with terminal 109, and thence to ground at 110 to complete the circuit. It will be recognized that energization of the solenoid coil 91 causes the core member 92 thereof to move upwardly, carrying therewith the horizontal cross connecting slide member 95 to bring contacts 97 and 98 into closed contact relation with their resepective contacts 99 and 100. This latter closure of the contacts 97 through 100 permits current to flow from conductor 90 through conductor 104, into contact arms 93 and 94 and cross connecting slide arm 95, through closed contacts 97 through 100, along conductor 102 to terminal 103 of the warning lamp breaker unit 23 and along conductor 48 through motor 25, and thence to ground at 51. As demonstrated in Figure 1, upon the energization of conductor 102, if both contact arms 111 and 112 were closed with their contacts 115 and 116 associated with terminal 103 of the breaker unit 23, then current would be allowed to flow through conductors 117, 120 and 125 to their respective lamps 14—15, 16—17, and 18—19. However, because of the energization of the motor 25, cam member 24 is caused to rotate axially with shaft 80, thereby causing an alternating making and breaking of the contacts 115 and 116 with their associated contact arms 111 and 112; this latter resulting in a flashing visual appearance and alternate energization of the warning and stop lights; the stop lights 18 and 19 being energized simultaneously with the set of warning lamps 14 and 15.

Again, as with the turn signal breaker unit 22, a warning pilot light 129 is provided to indicate to the user whether or not the warning and stop lights are operating properly. Similar to the circuit connection of pilot light 81, heretofore described, pilot light 129 is connected across the terminals 113 and 114 of the circuit breaker unit 23 by means of conductor 130. Again pilot light 129 is a high resistance type which is fed through conductor 130 from whichever of the terminals 113 or 114 is energized, depending on the position of rotation of the cam member or eccentric 24. Likewise, completion of the circuit through pilot light 129, similar to the circuit of pilot light 81, is accomplished through the ground connection associated with the sets of warning lamps 14 and 15 or 16 and 17, and the flashing stop lights 18 and 19; the current flowing from the pilot light 129 through the ground connection of whichever of said sets of warning lamps or stop lights are deenergized as determined by the rotated position of cam member 24.

Also associated with the warning and stop light circuit, described above, are the remote control switches 31, 32 and 33. As mentioned previously, the remote control switches 31 and 33 are preferably of the push button type and are associated with such mechanical operations as depression of the brake, opening of the door, or raising of a mechanical semaphore warning signal. As will be recognized from Figure 1, each of the switches 31, 32 and 33 is connected to conductor 106 of the warning lamp circuit by respective conductors 131, 132 and 133 and to ground, respectively, at 134, 135 and 136. Alternately, the switches 31 through 33 may be of an insulated type rather than of a grounded type, as they are illustrated in Figure 1; this alternate arrangement is represented by Figure 2 of the drawings and which will be explained more fully presently herein. Referring again to Figure 1, it will be seen that the actuation of the warning and stop light lamps may be accomplished by the closing of the circuit to ground through any one of the switches 31 through 33. For example, if switch 31 be closed, the circuit from battery 30 will include conductor 41, circuit breaker 27, conductor 90, solenoid coil 91, conductor 131, switch 31 and ground connection 134; this portion of the circuit permitting actuation of the solenoid core 92 upwardly to close contacts 97 through 100. Associated with conductor 90, as explained heretofore, is a secondary conductor 104 leading therefrom to cross bar 95 for the electrical energization of the contact arms 93 and 94, which permits energization of motor 25 and terminal 102 of the breaker unit 23 on the closure of the contacts 97 through 100 in response to upward movement of the solenoid core 92. The flashing energization of the warning and stop lights will occur, as heretofore described, through conductors 117, 120 and 125 in conjunction with the rotative actuation of cam member 24.

Referring to the alternate partial circuit plan as laid out in Figure 2 of the drawings, wherein switches 31, 32, and 33 are shown as of the insulated variety, it will be recognized that the circuit through the warning and stop lights may be energized by the depression of any of the switches numbered 31 through 33 as before. For example, if switch 31 in Figure 2 is closed, the circuit from battery to flashing warning lamps and stop lights will include conductor 41, circuit breaker 27, a newly introduced conductor 138, conductor 139 leading to switch 31, conductor 131 leading to conductor 106, solenoid coil 91 and alternate ground connection 110a. Also included in the circuit, to permit energization of the warning lamp breaker unit 23 and motor 25 from battery, will be conductor 41, circuit breaker 27, conductor 90, conductor 104, contact arms 93 and 94 and slide bar 95, contacts 97 through 100 and conductor 48 to motor 25, and conductor 102 to circuit breaker 23. If switches 32 and 33 are to be actuated, conductors 140 and 141, similar to conductor 139, connects such switches to the newly introduced conductor 138, thereby to permit passage of the energy from conductor 41 through conductor 138 and switches 32 and 33 in a similar manner. Also, with the alternate circuit demonstrated in Figure 2, bridging of the poles 107 and 109 by the selector lever 108 associated with warning lamp switch 105 permits completion of the circuits to the warning and stop lights, like before. In this latter instance, the circuit to the stop and warning lamps will include the battery 30, conductor 41, circuit breaker 27, newly introduced conductor 137, terminal 107, selector lever 108, terminal 109, conductor 106, solenoid coil 91 and core 92, and the alternate ground connection 110a. Energization of contacts 97 through 100 is again permitted through conductor 41, circuit breaker 27, conductor 90, conductor 104, contact arms 93 and 94 and slide bar 95, as before, whereby conductor 48 leading to motor 25 and conductor 102 leading to warning lamp breaker unit 23 are energized, as described heretofore.

Referring now specifically to Figures 4 through 6 of the drawings, wherein the physical embodiments of the steering column, dual warning lamp and turn indicating lamp switch unit 20 and the warning and turn signal lamp circuit breaker or flasher unit 21 is illustrated, it will be recognized, from Figure 4, that the dual turn and warning signal lamp switch unit 20 comprises an outer housing 150 suitably formed so as to house the turn signal and warning signal switches 45 and 105, respectively. The selective manual control and contact levers 44 and 108 are also associated with the housing 150, each projecting outwardly thereof for manual accessibility and having one end suitably journaled in housing 150 for operative association with their respective switches. In this latter connection, it will be recognized, with reference to Figures 4 and 5, that the control lever 44 is limited in its arcuate throw by a pair of upwardly projecting vertical post members 151, against which the lever 44 is moved in selectively bridging the dual poles of the switch 45, such as poles 46, 52 and 46, 56. Similarly, selective lever 108, associated with warning lamp signal switch 105, is provided with downwardly projecting stop post members 152 which limit the arcuate travel of the lever 108 in bridging the poles 107 and 109 of the warning lamp switch 105. The housing 150 is further provided with a clamping means 153 for mounting such to steering column 154 of the motorized vehicle to which the equipment herein described is to be mounted. Pilot lamps 81 and 129, indicating respectively the operation of the turn and warning signal lamps, are mounted in housing 150, such being visable to the driver from the upper surface of the housing 150, as specifically illustrated in Figure 3.

Referring again to Figures 4, 5, and 6 of the drawings, it will be recognized that the flasher unit 21, therein illustrated, comprises an integral cast outer housing 160 having a left-hand end plate 161 and a right-hand end plate 162, as viewed in Figure 5. The circuit breaker or fuse 27 is mounted above the housing 160 and to the right-hand end plate 162; having terminals 163 and 164 projecting through plate 162 for connection with circuit conductors, as illustrated in the schematic wiring diagram of Figure 1. Likewise, as clearly illustrated in Figures 4 and 5, the contact acuating solenoid unit 26 is mounted within housing 160 and on the inside of cover plate 162, so as to have connective terminals 165 and 166 project outwardly through such cover plate for circuit connection, as described heretofore. The motor 25 is adapted to be mounted below the housing 160, being vertically suspended by a mounting bracket 166 which is fitted with a vertical flanged portion 167 for connection to housing 160 and an additional flange 168 for mounting the bracket and flasher unit to a suitable panel or the like associated with the vehicle to which my equipment is attached. The armature shaft 60 of motor 25 projects upwardly into the hollowed out interior of housing 160 and is provided with suitable worm gear threads 170, as illustrated clearly in Figure 5. The worm threads 170, of course, are adapted for driving engagement with the worm gear 61 which, in turn, is mounted on horizontal shaft 80 for rotative axial movement transversely to the rotational axis of armature shaft 60 by a downwardly depending journalling bracket and bearing member 171, also illustrated in Figure 5 as being inside housing 160. The eccentric 24, of course, is journaled on the left-hand end of shaft 80, as illustrated clearly in Figure 6 of the drawings, such being adapted for simultaneously actuating the two breaker units 22 and 23, as described heretofore. The breaker unit 22 has its external terminals 55, 57, 65 and 72 projecting outwardly of the left-hand end of the flasher housing 160 to provide easy accessibility thereto in connecting the various conductors set forth in Figure 1 with that breaker. Likewise, breaker unit 23 has external terminals 103, 113 and 114 projecting outwardly from the flasher unit housing 160. By virtue of the unique and compact arrangement of the flasher unit 21, I am enabled to mount therein both of the breaker units 22 and 23, the solenoid unit 26, and the circuit breaker or fuse 27, so that these various devices in the circuit, set forth in Figure 1, may be associated in close relation as a single mountable unit, along with the driving motor 25, thereby to give great compactness and simplicity of installation to these devices. It further will be recognized that, by virtue of the single motor 25 driving an eccentric 24 mounted to a single shaft 80, I am enabled to simultaneously operate the turn signal and warning signal lamp breaker units 22 and 23, respectively, to give a maximum synchronization of the desired flashing energization of the warning, turn, and stop lights in my circuit arrangement.

A study of the breaker unit 22, as illustrated in Figure 1, will demonstrate that as the eccentric 24 is rotated in between the resilient contact leaves 64 and 71 thereof, the contacts 70 and 63 are alternately closed and opened to give a flashing appearance to the various turn lights 10 through 13, with only one set of turn lamps 10 and 11 or 12 and 13 being energized at one time, depending upon the disposition of the selective turn lever 44 associated with turn signal switch 45. Further, inspection of the breaker unit 23, as illustrated in Figure 1, will demonstrate that rotation of the eccentric 24 also alternately opens and closes contacts 115 and 116, thereby to cause corresponding flashing of the warning lights on opposite sides of the bus, as desired. In this latter connection, it is important to note that the warning lamp breaker and turn signal breaker contacts are so arranged, relative to eccentric 24, that it is impossible, upon simultaneous energization of both the turn signal and warning signal lamps, for the warning lights and turn signal lights on the same side of the bus to be energized together. This latter feature greatly reduces confusion to an observer of the lights, such as an operator of another vehicle on the highway, thus permitting immediate recognition of the intentions of the driver of a bus upon which my system is installed. It will further be recognized from Figure 1, that the flashing stop lights 18 and 19 are adapted for actuation only with the energization of the flashing warning lamps 14 and 15, although such an arrangement is purely optional, since it is equally feasible to actuate the stop lights with the warning lamps 16 and 17 or with both sets of warning lamps as desired. It will further be observed that by virtue of the installation of such optional control switches 31 through 33, operation of the warning and stop lights 14 through 19 may take place optionally as by opening the bus door, pressing on the brake pedal, raising a visual semaphore stop signal or like related functions of the bus.

Thus, it will be observed that I have provided an easy and convenient means whereby it is possible to control two or more electrical circuits for the energization of flashing signal lamps associated with a school bus or a like motorized vehicle, in particular one circuit directed to the energization of flashing turn signal lamps, a second circuit directed to the energization of flashing warning lamps, and a third circuit adapted for the energization of flashing stop lamps or the like. Further, by virtue of my signal breaker arrangement or flasher unit wherein the flashing breaker units for the turn signal lamps and warning signal lamps are actuated off a common eccentrically mounted cam, the flashing of incandescent lamps and the circuits to be controlled thereby is easily gained with means being provided for the automatic independent or simultaneous energization of at least two independent signal lamp circuits thereby. Further, as related to this latter feature, by virtue of the construction of the eccentrically driven flasher breaker units, as herein taught, a simple expedient for controlling the flashing turn signal and warning lamps is provided whereby, upon simultaneous actuation of the two separated circuits, a minimum of confusion will ensue in the observation of such lamps, since, at no time, will both the warning and signal lamps on the same side of the bus be energized simultaneously. Further, it will be appreciated that while I have herein illustrated a single eccentric actuating two breaker units, thereby to cause the flashing energization of the lamps associated with such breakers, additional breaker units may be mounted about the same eccentric whereby further circuits and signal lamps may likewise be energized to meet the various conditions of warning stop and turn light signals as desired, and as required by the various restrictions and laws of the several states. Moreover, it will be recognized that the circuit herein illustrated is complete and yet flexible in its design, with the number of lamps and their connective circuits capable of being controlled in the manner herein disclosed, being optional with the user, although the specific circuit herein illustrated is intended to demonstrate a typical circuit designed to meet the operating conditions of a typical bus or like vehicle in which such a circuit and control system is to be installed.

While I have herein demonstrated one form in which the teachings of my invention may occur, it readily will be recognized that numerous changes, modifications and substitutions of equivalents may be made therein without departing from the spirit and scope of my invention. I, therefore, do not wish to be restricted to the specific embodiment herein described, except as may appear in the following appended claims.

I claim:

1. In an electrical signal system for use with a source of electrical energy, a first incandescent lamp, a second incandescent lamp, a first circuit connecting said first lamp with said source of energy and comprising a cam actuated circuit breaker, a motor for actuating said circuit breaker, and selective control switch means for selectively energizing said first circuit; a second circuit connecting said second lamp with said source of electrical energy and comprising an electrically responsive contact operating solenoid unit, a second cam actuated circuit breaker, said motor, and a second selective control switch means for manually controlling said second circuit; said motor being common to and controlled by both of said circuits and rotatively driving a single cam common to both of said circuit breakers thereby to cause periodic illumination of said two lamps when their associated circuits are energized.

2. In an electrical signal system for use with a source of electrical energy, a first incandescent lamp, a second incandescent lamp, a first circuit connecting said first lamp with said source of electrical energy comprising a cam actuated circuit breaker, a motor for actuating said circuit breaker, and a selective control switch means for selectively energizing said first circuit; a second circuit connecting said second lamp with said source of electrical energy comprising an electrically responsive multiple contact operating solenoid unit, a second cam actuated circuit breaker, said motor, and a second selective control switch means for selectively energizing said second circuit; a single eccentric cam common to both of said circuit breakers and rotatably driven by said motor to actuate said circuit breakers, with each of said circuit breakers serving to cause periodic energization of said lamp associated in circuit therewith, and said two breakers being so related to said eccentric as to cause a synchronized alternate periodic energization of said two lamps when both of said circuits are energized.

3. A signal system in a motorized vehicle and for use with a source of electrical energy, comprising a plurality of electrically operated signal devices mountable adjacent the four corners of said vehicle and an additional plurality of signal devices mountable on the front and rear and on opposite sides of said vehicle intermediate said corner positioned signal devices, one circuit connecting said corner positioned signal devices with said source of electrical energy, a second circuit likewise connecting said intermediate positioned signal devices to said source of energy, switch means in each of said circuits between said source of electrical energy and said several signal devices for selectively controlling the energization of said corner positioned and intermediate positioned signals so that said two circuits may be energized individually and simultaneously, and motorized cam actuated circuit breaker means common to said two circuits for causing interrupted energization of said corner and intermediate positioned signal devices simultaneously and individually, said switch and circuit breaker means being so synchronized as to permit only the simultaneous energization of said corner and intermediate positioned signal devices which are located on unlike sides of said vehicle.

4. A signal system for use in a motorized vehicle and having connection with a source of electrical energy comprising, a plurality of electrically responsive incandescent signal lamps mountable adjacent the four corners of said vehicle, an additional plurality of incandescent signal lamps mounted on the front and rear and on opposite sides of said vehicle, but intermediate said corner positioned signal lamps, a first circuit connecting said corner positioned signal lamps with said source of electrical energy, a second circuit likewise connecting said intermediate signal lamps to said source of electrical energy, selective control switch means in said first circuit between said source of electrical energy and said first mentioned signal lamps for selectively controlling the energization of the latter, a second selective control switch means in said second circuit between said source of electrical energy and said intermediate positioned signal lamps for selectively controlling the energization of said intermediate positioned signal lamps, an electromagnetic multiple contact solenoid unit in said second circuit, an electric motor common to both of said circuits, a pair of cam operated circuit breakers, one in each of said circuits; both circuit breakers being adapted for actuation by a common eccentric cam means which is rotatably driven by said motor, whereby said two circuits may be energized either individually or simultaneously with said circuit breakers serving to cause interrupted energization of said corner and intermediate position lamps; said circuit breakers being so synchronized and related with respect to said eccentric cam as to cause alternate periodic illumination of said corner and intermediate positioned lamps when their respective circuits are energized simultaneously.

5. In an automotive vehicle's electrical signal system for use with a source of electrical energy, a first set of incandescent turn signal lamps, a second set of incandescent warning signal lamps, a first electrical circuit for energizingly connecting said turn signal lamps with said source of electrical energy, comprising, a cam actuated circuit breaker, an electric motor for actuating said circuit breaker, and a manually operable selective control switch means for selectively controlling the energization of said first circuit and said associated turn signal lamps; a second circuit for energizingly connecting said warning signal lamps with said source of electrical energy, comprising, an electrically responsive solenoid means adapted to operate a plurality of circuit closing contacts, a cam actuated circuit breaker, said electric motor, and a manually operable selective control switch for selectively controlling the energization of said second circuit and its associated warning signal lamps; said motor being common to both of said circuits and the energization thereof being controlled by either or both of said selective control switches with said cam actuated circuit breakers operating from a common cam driven by said motor to cause periodic energization of said two sets of lamps associated respectively therewith.

6. An electric signal system for use with a source of electrical energy in an automotive vehicle, comprising in combination, a plurality of visual turn signal lamps connected in circuit with said source of electrical energy, said turn signal lamp circuit comprising a cam actuated circuit breaker, an electric motor for rotatably driving a cam associated with said circuit breaker, and a manually operable selective control switch for regulating the energization of said turn signal circuit; a plurality of visual warning signal lamps and a plurality of visual stop signal lamps connected by a second circuit with said source of electrical energy, said second circuit comprising a second cam actuated circuit breaker having separated contacts independently related in circuit with the warning and stop signal lamps, said electric motor for rotatably driving said cam which is common to both of said circuit breakers, a multiple contact operating solenoid switching unit controlling circuit energization of said motor and second circuit breaker, a second manually operable selective control switch and a plurality of remote control switches each for regulating independently the energization of said solenoid unit said motor being energized in either of said circuits by circuit closing actuation of said switches contained respectively therein, and said two circuit breakers serving to cause periodic illumination of the lamps in circuit therewith, such circuit breakers being so synchronized and interrelated with said common motor driven cam as to cause alternate periodic illumination of said lamps when both of said circuits are energized.

7. An electrical signal system of the class described for use with a motor vehicle and adapted to be energized by a source of electrical potential, comprising a plurality of incandescent signal lamps, a first circuit connecting a first set of said lamps with said source of potential, a second circuit connecting a second set of said lamps with said source of electric potential, a selective control switch in said first circuit for selectively energizing said first set of lamps, a cam actuated circuit breaker in said first circuit for causing a periodic energization of said first set of lamps, an additional selective control switch in said second circuit for selectively controlling the energization thereof, a second cam actuated circuit breaker in said second circuit for causing the periodic illumination of said second set of lamps, a solenoid unit constructed and arranged to control energization of said second circuit breaker, and an electric motor common to both of said circuits adapted to rotatably drive a single cam common to both of said circuit breakers, said motor being energized upon the closure of either or both of said control switches with the periodic energization of said two sets of lamps occurring alternately when both of said switches are closed.

8. In an electrical signal system of the class described for use with a source of electrical energy, a first turn signal lamp, a second warning signal lamp, a first circuit connecting said first lamp with said source of electrical energy and comprising a cam actuated circuit breaker, an electric motor for actuating said circuit breaker, a pilot light having a high resistance filament, and a manually operable selective control switch means for selectively energizing said first circuit; a second circuit connecting said second lamp with said source of electrical energy comprising an electrically responsive contact operating solenoid unit, a second cam actuating circuit breaker, said electric motor, said second circuit breaker being energizable after contact closing operation of said solenoid unit, a second pilot lamp having a high resistance filament, and a second manually operable selective control switch means for selectively energizing said second circuit; said motor being common to both of said circuits and rotatably driving a single cam common to both of said circuit breakers thereby to cause periodic energization and flashing illumination of said turn and warning signal lamps associated respectively with said two circuit breakers, each of said pilot lights in said two circuits being illuminated in an interrupted periodic manner, illumination thereof being controlled by said circuit breakers and occurring when the signal lamp associated respectively, in circuit therewith, is deenergized as determined by according actuation of its associated circuit breaker.

CLARENCE RINGWALD.

References Cited in the file of this patent
UNITED STATES PATENTS

| Number | Name | Date |
|---|---|---|
| 2,090,332 | O'Neil | Aug. 17, 1937 |
| 2,122,508 | Bell | July 5, 1938 |
| 2,358,332 | Kennett | Sept. 19, 1944 |